(12) United States Patent
Hsiao et al.

(10) Patent No.: US 10,429,693 B2
(45) Date of Patent: Oct. 1, 2019

(54) BACKLIGHT SOURCE BASED ON GRAPHENE, FIELD COLOR SEQUENTIAL LIQUID CRYSTAL DISPLAY DEVICE, AND DRIVING METHOD FOR THE SAME

(71) Applicant: Shenzhen China Star Optoelectronics Technology Co., Ltd., Shenzhen, Guangdong (CN)

(72) Inventors: Yuchun Hsiao, Guangdong (CN); Yong Fan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 109 days.

(21) Appl. No.: 15/517,611

(22) PCT Filed: Feb. 27, 2017

(86) PCT No.: PCT/CN2017/075043
§ 371 (c)(1),
(2) Date: Apr. 7, 2017

(87) PCT Pub. No.: WO2018/148986
PCT Pub. Date: Aug. 23, 2018

(65) Prior Publication Data
US 2018/0267360 A1  Sep. 20, 2018

(30) Foreign Application Priority Data

Feb. 17, 2017  (CN) .......................... 2017 1 0087512

(51) Int. Cl.
*G02F 1/1335*  (2006.01)
*G09G 3/34*  (2006.01)
*G09G 3/36*  (2006.01)

(52) U.S. Cl.
CPC .. *G02F 1/133603* (2013.01); *G02F 1/133621* (2013.01); *G09G 3/3413* (2013.01);
(Continued)

(58) Field of Classification Search
CPC ......... G02F 1/133603; G02F 1/133621; G02F 1/133609; G02F 2001/133622;
(Continued)

(56) References Cited

U.S. PATENT DOCUMENTS

2011/0095268 A1  4/2011  Choi
2017/0017120 A1* 1/2017  Choi ................. G02F 1/133621
(Continued)

FOREIGN PATENT DOCUMENTS

CN  104143532 A  11/2014
CN  105303985 A  2/2016
(Continued)

*Primary Examiner* — Charles S Chang
(74) *Attorney, Agent, or Firm* — Andrew C. Cheng

(57) ABSTRACT

The present disclosure relates to a backlight source based on grapheme including a lower substrate, an upper substrate and a first insulation layer, multiple gate electrodes, a second insulation layer, multiple graphene quantum dot layers, and multiple groups of source electrodes and drain electrodes sequentially disposed there between. The multiple graphene quantum dot layers are separately disposed on the second insulation layer, and one source electrode and one drain electrode are disposed on each graphene quantum dot layer. A field color sequential LCD and a driving method are also disclosed. Through controlling the gate voltage of the backlight source based on graphene, the backlight source has a precise region light control ability to avoid a color gamut reduction phenomenon because of the color crosstalk.

9 Claims, 4 Drawing Sheets

(52) U.S. Cl.
CPC ......... *G09G 3/36* (2013.01); *G02F 1/133609* (2013.01); *G02F 2001/133622* (2013.01); *G02F 2202/108* (2013.01); *G09G 2310/0235* (2013.01)

(58) Field of Classification Search
CPC .. G02F 2202/108; G09G 3/3413; G09G 3/36; G09G 2310/0235
USPC .......................................................... 349/62
See application file for complete search history.

(56) References Cited

U.S. PATENT DOCUMENTS

| | | | |
|---|---|---|---|
| 2018/0088379 A1* | 3/2018 | Fan | ................... H01L 33/26 |
| 2018/0090638 A1* | 3/2018 | Fan | ................ G02F 1/133603 |

FOREIGN PATENT DOCUMENTS

| | | |
|---|---|---|
| CN | 105629576 A | 6/2016 |
| CN | 105702697 A | 6/2016 |
| CN | 105867018 A | 8/2016 |
| CN | 106782352 A | 5/2017 |

* cited by examiner

BACKLIGHT SOURCE BASED ON GRAPHENE, FIELD COLOR SEQUENTIAL LIQUID CRYSTAL DISPLAY DEVICE, AND DRIVING METHOD FOR THE SAME

BACKGROUND OF THE INVENTION

1. Field of the Invention

The present invention relates to a liquid crystal display technology field, and more particularly to a backlight source based on graphene, a field color sequential liquid crystal display device, and a driving method for the same.

2. Description of Related Art

As a new product suddenly popular in the recent years, the liquid crystal display device has entirely replaced the heavy CRT (Cathode ray tube) display and become a mainstream display device. Generally, a liquid crystal display is formed by a backlight module for providing a backlight source and a display panel for displaying an image. The display panel is integrated with a color filter so that the display panel can display various gorgeous images. However, the light energy utilization rate of the liquid crystal display having the color filter is not high, which is not conducive for saving power.

SUMMARY OF THE INVENTION

In order to overcome the deficiency of the conventional art, the present invention provides a backlight source based on graphene, a field color sequential liquid crystal display device, and a driving method for the same in order to omit the color filter in the liquid crystal panel, increase the utilization rate of the backlight, and decrease the power consumption.

In order to realize the above purpose, the present invention adopts the following technology solution:

A backlight source based on graphene, comprising: a lower substrate; an upper substrate; and a first insulation layer, multiple gate electrodes, a second insulation layer, multiple graphene quantum dot layers, and multiple groups of source electrodes and drain electrodes which are sequentially disposed between the lower substrate and the upper substrate from a bottom to a top; wherein, the multiple graphene quantum dot layers are separately disposed on the second insulation layer, and one of the source electrodes and one of the drain electrodes are disposed on each graphene quantum dot layer.

As one embodiment, the lower substrate and/or the upper substrate are a substrate that can block water and oxygen.

As one embodiment, the graphene quantum dot layer is made of reduced graphene oxide and/or the second insulation layer is made of graphene oxide.

As one embodiment, an upper surface and a lower surface of the second insulation layer are respectively provided with multiple recess portions disposed separately, and the gate electrodes and the graphene quantum dot layers are respectively embedded into corresponding recess portions.

As one embodiment, a light reflection layer is further disposed between the first insulation layer and the lower substrate, and the light reflection layer covers on the lower substrate.

As one embodiment, the backlight source further includes a prismatic brightness enhancing layer disposed on the upper substrate.

As one embodiment, the backlight source further includes a reflective polarizing brightness enhancing film disposed on the prismatic brightness enhancing layer.

Another purpose of the present invention is to provide a field color sequential liquid crystal display device, comprising a backlight source based on graphene, a liquid crystal display panel and a field color sequential control module, and the field color sequential control module controls a gate voltage of the backlight source in order to change a backlight color of the backlight source As one embodiment, a frame period of the backlight source includes multiple sub-frame periods, and during a backlight period of each sub-frame period, the gate voltage of the backlight source at least has voltages respectively corresponding to three backlight colors of red, green and blue, and in the backlight period of each sub-frame period, a switching sequence of the backlight colors is consistent.

Another purpose of the present invention is to provide a driving method for a field color sequential liquid crystal display device, comprising providing image data having different colors to the liquid crystal display panel; controlling the backlight color of the backlight source based on graphene such that the frame period of the backlight source includes multiple sub-frame periods and a switching sequence of the backlight color of each sub-frame period is consistent.

The present invention can realize a color field timing display through controlling the gate voltage of the backlight source based on graphene such that the backlight source has a precise region light control ability so as to avoid a color gamut reduction phenomenon because of the color crosstalk. Besides, the graphene light-emitting device utilizes a timing driving so as to omit the color filter of the liquid crystal panel in order to improve the light utilization rate of the backlight source and reduce the power consumption.

DETAILED DESCRIPTION OF THE PREFERRED EMBODIMENT

In order to make the purpose, the technology solution and the advantage to be clearer, the following content will combine with the figures and the embodiments for illustrating the present invention in detail. It should be understood that the specific embodiments described here are only used to explain the present invention, not to limit the present invention.

Figure 1:
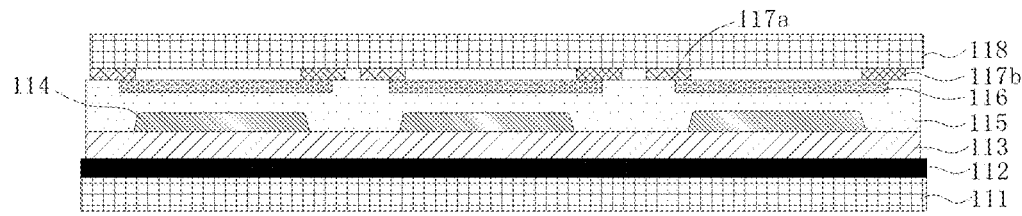
FIG. 1 is a schematic diagram of a stacked structure of a light-emitting portion of the backlight source based on graphene according to an embodiment of the present invention.

The backlight source of the present invention is based on graphene light-emitting. The color of the emitted light can be changed through adjusting the gate voltage in order to realize adjustable backlight color. With reference to FIG. 1, the backlight source of the present embodiment includes two layers of substrates: a lower substrate 111 and an upper substrate 118; a first insulation layer 113, multiple gate electrodes 114, a second insulation layer 115, multiple graphene quantum dot layers 116, multiple groups of source electrodes 117a and drain electrodes 117b which are sequentially disposed between the lower substrate 111 and the upper substrate 118 from a bottom to a top. The multiple graphene quantum dot layers 116 are separately disposed on the second insulation layer 115, and each graphene quantum dot layer 116 is disposed with one source electrode 117a and one drain electrode 117b. The graphene quantum dot layer 116 functions as a light-emitting element, and through applying corresponding voltages to the gate electrode 114, the source electrode 117a and the drain electrode 117b, a light is emitted. Through the multiple graphene quantum dot layers 116 arranged as a matrix on a same plane, a backlight source based on graphene can be realized.

In the present embodiment, the source electrode 117a and the drain electrode 117b adopts reduced graphene oxide, and the gate electrode 114 can adopt graphene, metal or transparent metal oxide. The graphene quantum dot layer 116 is made of reduced graphene oxide, and the second insulation layer 115 is made of graphene oxide, the lower substrate 111 and the upper substrate 118 adopts a substrate that can block water and oxygen such as a glass substrate or a plastic substrate that can block water and oxygen. Accordingly, the light-emitting elements packaged between the two substrates will not be oxidized or entered with water such that the reliability of the entire backlight source is improved.

An upper surface and a lower surface of the second insulation layer 115 are respectively provided with multiple recess portions disposed separately. The gate electrodes 114 and the graphene quantum dot layers 116 are respectively embedded into corresponding recess portions. Accordingly, the compactness of the backlight source can be increased maximally so that the backlight source can be thinner.

A light reflection layer 112 is further disposed between the first insulation layer 113 and the lower substrate 111. The light reflection layer 112 covers on the lower substrate 111, and can be an enhanced reflection layer such as a metal reflection layer, a metal or a combination of multiple metal oxide layers. The first insulation layer 113 is disposed between the gate electrode 114 and the light reflection layer 112. The second insulation layer 115 is disposed between the gate electrode 114 and the graphene quantum dot layer 116. A surface of each graphene quantum dot layer 116 is disposed with one source electrode 117a and one drain electrode 117b. Between the light reflection layer 112 and the gate electrode 114, the gate electrode 114, the graphene quantum dot layer 116, the source electrode 117a, and the drain electrode 117b are not interfered with each other so that a short circuit inside the backlight source to affect a normal light-emitting can be avoided.

Figure 2:
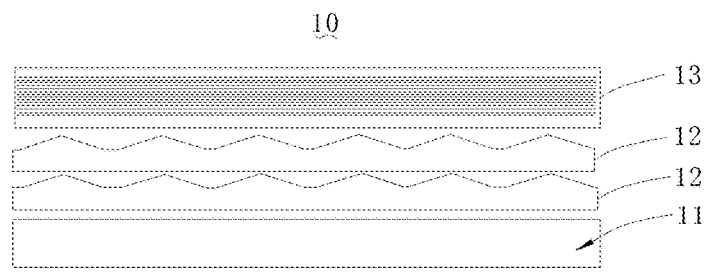
FIG. 2 is a schematic diagram of a stacked structure of the backlight source based on graphene according to an embodiment of the present invention.
Figure 3:
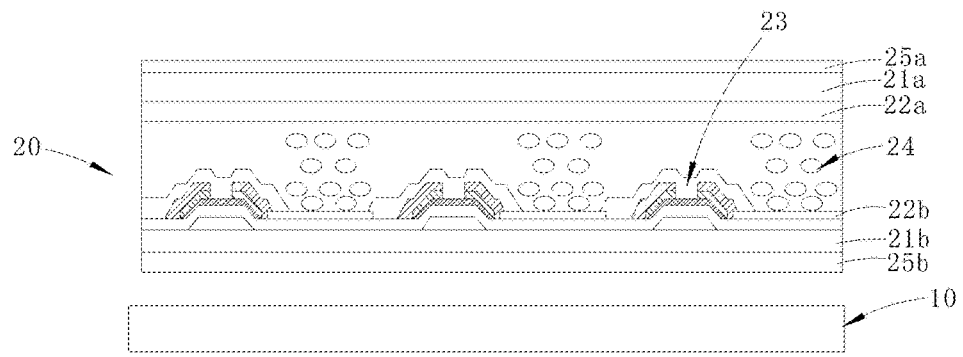
FIG. 3 is a schematic diagram of a field color sequential liquid crystal display device according to an embodiment of the present invention.

As shown in FIG. 2 and FIG. 3, on the upper substrate 118 of the backlight source 10, a prismatic brightness enhancing layer 12 and a dual-brightness enhance film (DBEF, a reflective polarizing brightness enhancing film) 13 are stacked and are provided sequentially. The light emitted from the graphene quantum dot layers 116 enters into the liquid crystal display panel 20 through a condensing of the prismatic brightness enhancing layer 12 and a light enhancing of the reflective polarizing brightness enhancing film 13 such that the light utilization rate of the liquid crystal panel 20 is effectively increased. In one embodiment, the prismatic brightness enhancing layer 12 has two layers. Directions of prisms of the two layers of prismatic brightness enhancing layer 12 can be different. Specifically, the light-emitting direction of the prismatic brightness enhancing layer 12 can be changed according to an actual requirement.

Figure 4:
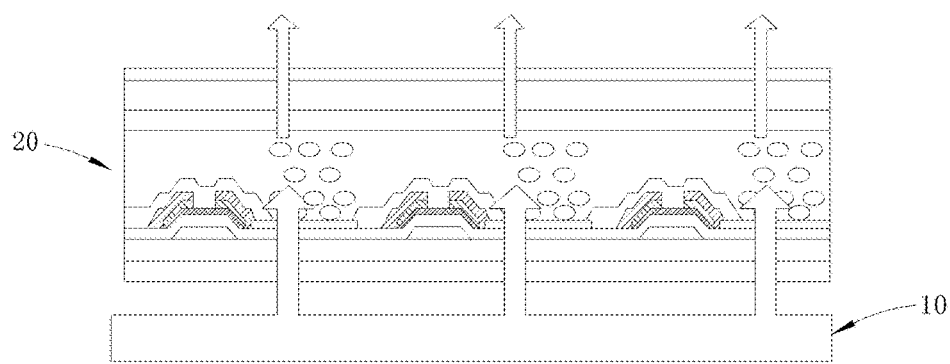
FIG. 4 is a schematic diagram of single color emitting of the field color sequential liquid crystal display device according to an embodiment of the present invention.
Figure 5:
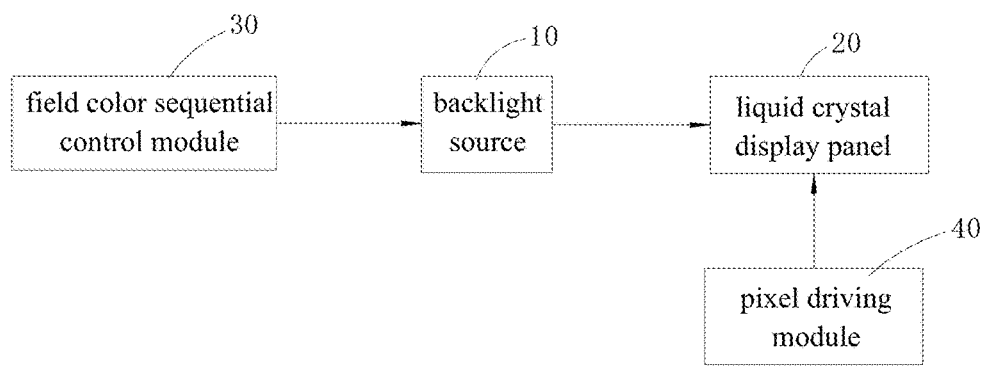
FIG. 5 is a schematic diagram of modules of the field color sequential liquid crystal display device according to an embodiment of the present invention.

With reference to FIG. 4 and FIG. 5, except the backlight source 10 based on graphene and the liquid crystal display panel 20, the field color sequential liquid crystal display device of the present embodiment further includes a field color sequential control module 30 for controlling the color of the backlight, and a pixel driving module 40 for controlling a brightness degree of each pixel inside the liquid crystal display panel 20. The field color sequential control module 30 changes the color of the backlight source through controlling the gate voltage of the gate electrode 114 of the backlight source 10. The pixel driving module 40 is used for transferring predetermined image data to the liquid crystal display panel 20, and changing the brightness degree of the corresponding pixel in real time according to the predetermined image data. The field color sequential module 30 and the pixel driving module 40 are cooperated with each other such that a predetermined display image is formed on the liquid crystal display panel 20 finally.

With reference to FIG. 3, because the backlight source 10 can display multiple different colors itself, the liquid crystal display panel 20 can omit a color filter. The liquid crystal display panel 20 includes an upper glass substrate 21a and a lower glass substrate 21b, an upper electrode 22a and a lower electrode 22b respectively located at inner sides of the upper glass substrate 21a and the lower glass substrate 21b, a TFT array 23, liquid crystals 24, and an upper polarizer 25a and a lower polarizer 25b respectively adhered to outer surfaces of the upper glass substrate 21a and the lower glass substrate 21b. The liquid crystal display panel does not require a color filter. The backlight source 10 can realize a field color sequential display, increasing the utilization rate of the backlight, and decreasing the power consumption.

A frame period of the backlight source includes multiple sub-frame periods, and during a backlight period of each sub-frame period, the gate voltage of the backlight source includes voltages respectively corresponding to three backlight colors of red, green and blue, and in the backlight period of each sub-frame period, a switching sequence of the backlight colors is consistent.

Figure 6:
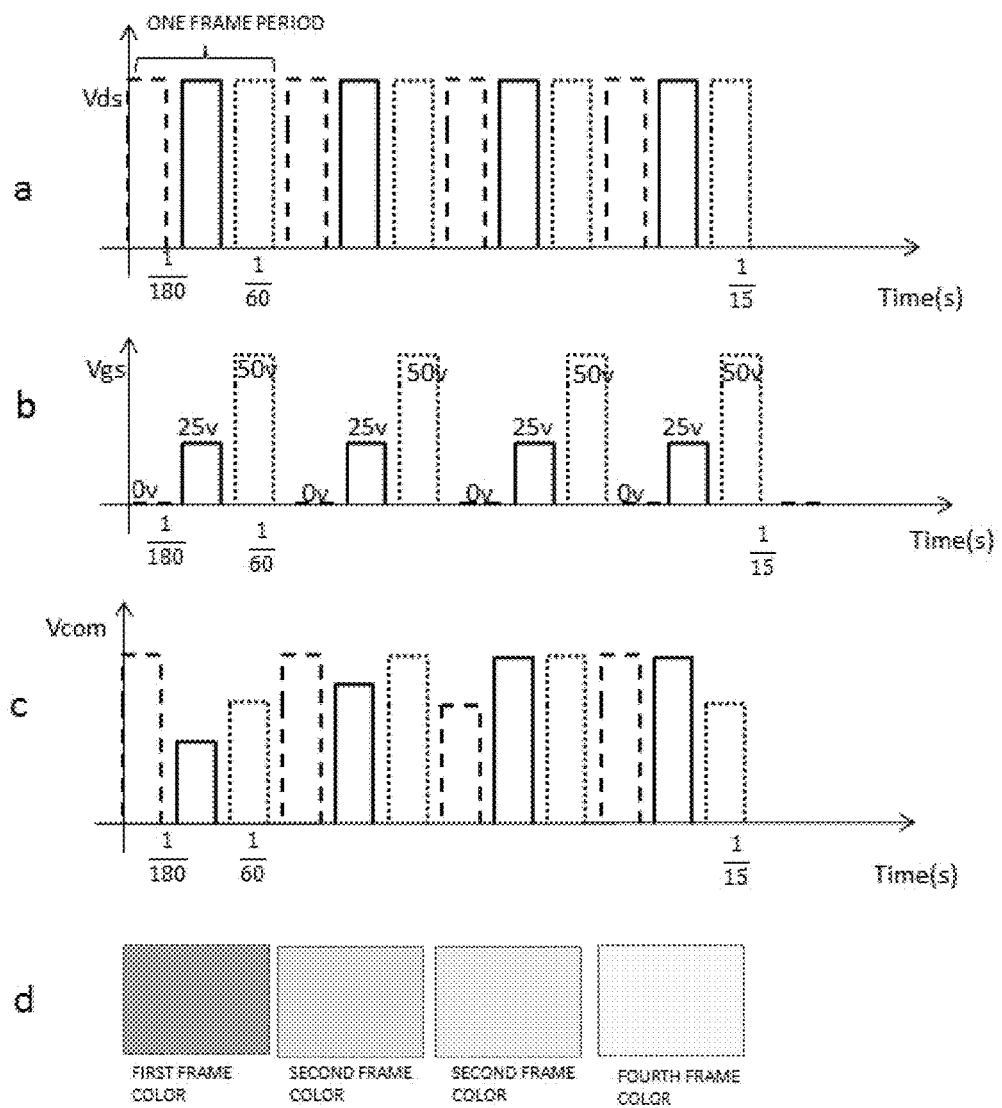
FIG. 6 is a schematic diagram of the color sequence of the backlight of the backlight source according to an embodiment of the present invention.
Figure 7:
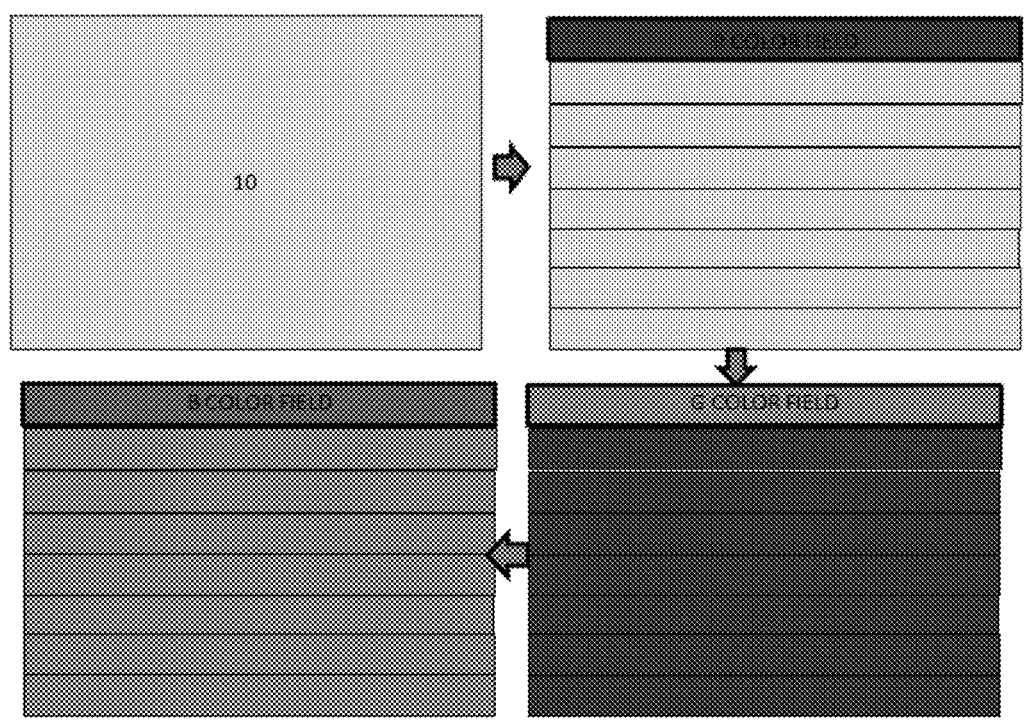
FIG. 7 is a schematic diagram of a driving process of the color sequence of the backlight source according to an embodiment of the present invention.

In order to illustrate the present invention clearly, the following utilize a specific color sequential driving method as an example. As shown in FIG. 6, FIG. 6 is a schematic diagram of the color sequence of the backlight of the backlight source according to an embodiment of the present invention; and FIG. 7 is a schematic diagram of a driving process of the color sequence of the backlight source according to an embodiment of the present invention.

A frame period of the backlight source 10 includes multiple sub-frame periods. A complete frame period corresponds to a continuous picture. A sub-frame period corresponds to a frame of one picture. Here, using a complete frame period including four sub-frame periods as an example. The frame period of the above example is $1/15$ second, and the sub-frame period is $1/60$ second. In a backlight period of each sub-frame period, gate voltage of the backlight source has voltages respectively corresponding to three backlight colors of red, green and blue. Besides, in the backlight period of each sub-frame period, the switching sequence of the backlight colors is consistent.

When the gate voltage Vgs (as shown as "b" in FIG. 6) is a low voltage in a range of 0-12V, the graphene backlight source emits a red light. When the gate voltage Vgs is a low voltage in a range of 20-35V, the graphene backlight source emits a green light. When the gate voltage Vgs is a low voltage in a range of 40-50V, the graphene backlight source emits a blue light. The drain voltage Vds (as shown as "a" in FIG. 6) remain constant in each sub-frame period. The common voltage Vcom (as shown as "c" in FIG. 6) is changed according to an actual requirement. Finally, four frames having corresponding colors are formed as shown as "d" in FIG. 6. In the backlight source, types and changing sequences of each sub-frame period is consistent, and the above embodiment using a sequence of red, green and blue as an example. It can be understood that in other embodiments, types and changing sequences of the backlight colors of the sub-frame period are not limited. For example, a sequence of red, blue and green, a sequence of blue, green and red, a sequence of red, green blue and yellow, a sequence of green, red, blue and yellow, or a sequence of red, green, blue and cyan can also be adopted.

The driving method of the field color sequential liquid crystal display device of the present embodiment is: providing image data having different colors to the liquid crystal display panel; controlling the backlight color of the backlight source based on graphene such that the frame period of the backlight source includes multiple sub-frame periods and a switching sequence of the backlight color of each sub-frame period is consistent. When the backlight source displays a red color, the backlight source scans along a predetermined direction from a first scanning region of the backlight source until finish scanning a last scanning region. As shown in FIG. 7, the backlight of the backlight source performs scanning from a top to a bottom, the uppermost location of the backlight source is the first scanning region, and the lowermost location of the backlight source is the last scanning region, and the scanning direction is from the top to the bottom. When a red color field is scanning, the backlight scans from the first scanning region to the last scanning region. After the red color field finishes scanning, the green color filed starts scanning, and the backlight scans from the first scanning region to the last scanning region again. After the green color field finishes scanning, the blue color filed starts scanning, and the backlight scans from the first scanning region to the last scanning region again. At this point, a continuous picture finishes scanning. In the above process, the pixel driving module 40 controls corresponding pixels to be turned on and turned off according to a predetermined image data.

In summary, the present invention can realize a color field timing display through controlling the gate voltage of the backlight source based on graphene such that the backlight source has a precise region light control ability so as to avoid a color gamut reduction phenomenon because of the color crosstalk. Besides, the graphene light-emitting device utilizes a timing driving so as to omit the color filter of the liquid crystal panel in order to improve the light utilization rate of the backlight source and reduce the power consumption.

The above content combines the embodiments to describe the present invention, however, the implement of the present invention is not limited. Within the spirit and scope of present invention, the person in this technology field can perform various modifications and variations. The modifications and variations are still covered by the claims in the present invention.

What is claimed is:
1. A backlight source based on graphene, comprising:
    a lower substrate;
    an upper substrate; and
    a first insulation layer, multiple gate electrodes, a second insulation layer, multiple graphene quantum dot layers, and multiple groups of source electrodes and drain electrodes which are sequentially disposed between the lower substrate and the upper substrate from a bottom to a top;
    wherein, the multiple graphene quantum dot layers are separately disposed on the second insulation layer, and one of the source electrodes and one of the drain electrodes are disposed on each graphene quantum dot layer;
        wherein each of an upper surface and a lower surface of the second insulation layer is provided with multiple recess portions disposed separately, and the gate electrodes are embedded into corresponding recess portions at the lower surface of the second insulation layer and the graphene quantum dot layers are embedded into corresponding recess portions at the upper surface of the second insulation layer;
        wherein a width of the graphene quantum dot layer is greater than a width of the gate electrode; and
        wherein a light reflection layer is further disposed between the first insulation layer and the lower substrate, and the light reflection layer covers on the lower substrate.

2. The backlight source based on graphene according to claim 1, wherein, the lower substrate and/or the upper substrate are a substrate that can block water and oxygen.

3. The backlight source based on graphene according to claim 1, wherein, the graphene quantum dot layer is made of reduced graphene oxide and/or the second insulation layer is made of graphene oxide.

4. The backlight source based on graphene according to claim 1, wherein, the backlight source further includes a prismatic brightness enhancing layer disposed on the upper substrate.

5. The backlight source based on graphene according to claim 4, wherein, the backlight source further includes a reflective polarizing brightness enhancing film disposed on the prismatic brightness enhancing layer.

6. A field color sequential liquid crystal display device, comprising:
    a backlight source based on graphene, a liquid crystal display panel and a field color sequential control module, wherein the backlight source comprises:
    a lower substrate;
    an upper substrate; and
    a first insulation layer, multiple gate electrodes, a second insulation layer, multiple graphene quantum dot layers, and multiple groups of source electrodes and drain electrodes which are sequentially disposed between the lower substrate and the upper substrate from a bottom to a top;
    wherein, the multiple graphene quantum dot layers are separately disposed on the second insulation layer, and one of the source electrodes and one of the drain electrodes are disposed on each graphene quantum dot layer; and
        wherein the field color sequential control module controls a gate voltage of the backlight source in order to change a backlight color of the backlight source;

wherein each of an upper surface and a lower surface of the second insulation layer is provided with multiple recess portions disposed separately, and the gate electrodes are embedded into corresponding recess portions at the lower surface of the second insulation layer and the graphene quantum dot layers are embedded into corresponding recess portions at the upper surface of the second insulation layer;

wherein a width of the graphene quantum dot layer is greater than a width of the gate electrode; and wherein a light reflection layer is further disposed between the first insulation layer and the lower substrate, and the light reflection layer covers on the lower substrate.

7. The field color sequential liquid crystal display device according to claim 6, wherein, a frame period of the backlight source includes multiple sub-frame periods, and during a backlight period of each sub-frame period, the gate voltage of the backlight source at least has voltages respectively corresponding to three backlight colors of red, green and blue, and in the backlight period of each sub-frame period, a switching sequence of the backlight colors is consistent.

8. The field color sequential liquid crystal display device according to claim 6, wherein, the backlight source further includes a prismatic brightness enhancing layer disposed on the upper substrate.

9. The field color sequential liquid crystal display device according to claim 8, wherein, the backlight source further includes a reflective polarizing brightness enhancing film disposed on the prismatic brightness enhancing layer.

* * * * *